UNITED STATES PATENT OFFICE.

JULIUS FREDERICK HOFFMANN, OF CHICAGO, ILLINOIS.

IMPROVEMENT IN THE MANUFACTURE OF ARTIFICIAL STONE.

Specification forming part of Letters Patent No. 131,348, dated September 17, 1872.

*To all whom it may concern:*

Be it known that I, JULIUS FREDERICK HOFFMANN, of Chicago, in the county of Cook and State of Illinois, have invented a new and useful Improvement in the Manufacture of Artificial Stone; and I do declare that the following is a true and accurate description thereof.

To one (1) part of pulverized chalk I add from two (2) to four (4) parts of sharp sand and from one (1) to two (2) parts of hydraulic cement of good quality, and sufficient water, and mix this thoroughly. Shortly before this mixture is to be molded into stone I add to every one hundred (100) pounds of the above five (5) pounds of another mixture, composed of one hundred (100) pounds of plaster of Paris and ten (10) pounds of powdered burnt borax. This I mix thoroughly, stamp and pound it into molds, which give it the desired form, and after removing the thus-formed artificial stone from the mold I leave the same exposed to the atmosphere for from three to six days, according to its capacity; and during this time I sprinkle it over with water frequently, after which it is ready for use.

I can give to my artificial stone any desired color by adding to the above-specified mixture more or less of red, blue, yellow, or black color, and thus can give it the appearance of any kind of natural stone.

The artificial stone made by this process has a clean and smooth appearance, regularity of color, and will resist the changes of the weather better than any artificial stone heretofore made.

What I claim as my invention, and desire to secure by Letters Patent, is—

The manufacture of artificial stone of the ingredients and in the manner herein described.

JULIUS FREDERICK HOFFMANN.

Witnesses:
WM. H. LOTZ,
THEO. KARLS.